July 30, 1929.   F. M. ROSENZWEIG   1,722,827
INDUCTION TRAIN CONTROL SYSTEM
Filed March 13, 1924
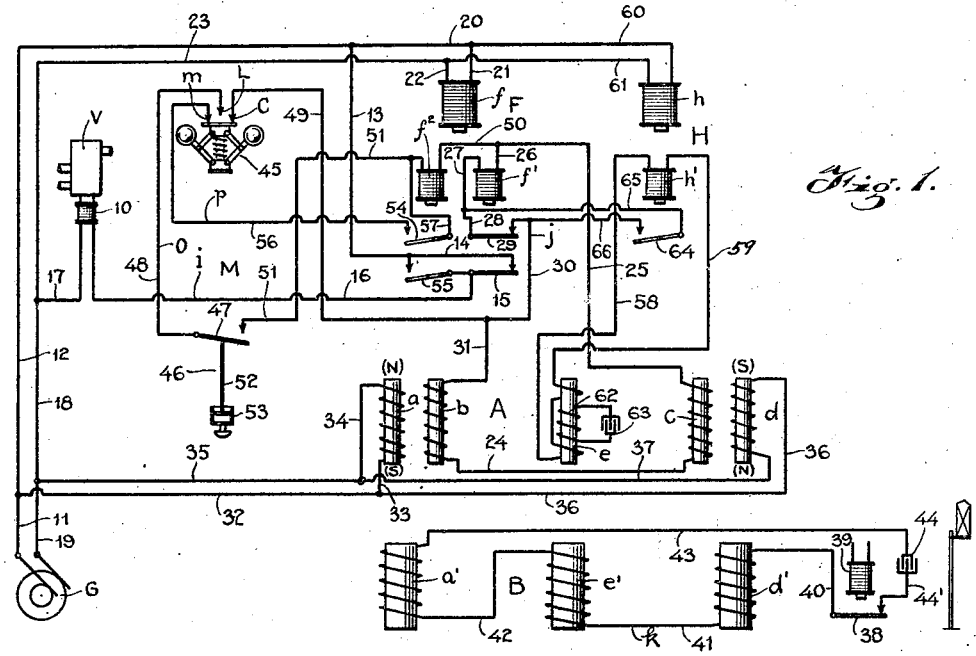
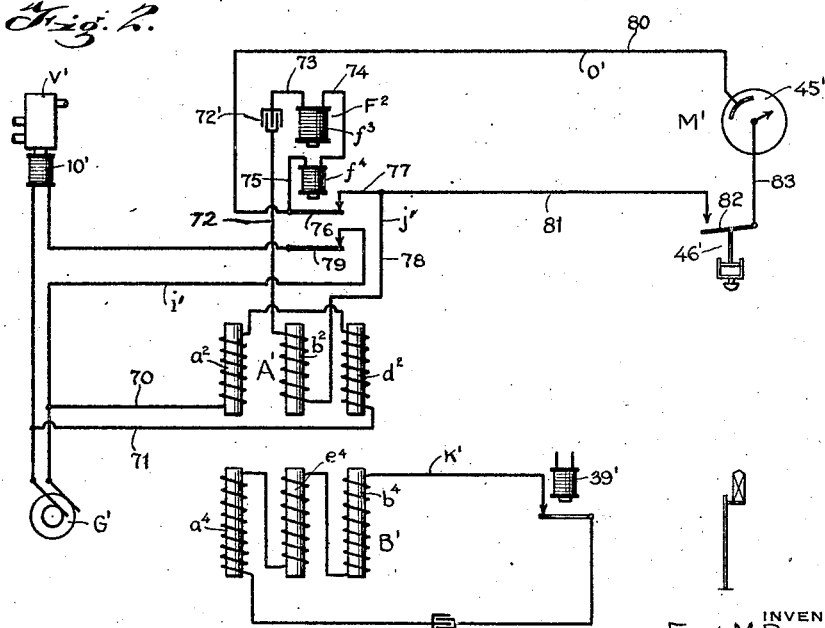
INVENTOR
Fred M. Rosenzweig
BY
Meyers & Cavanagh
ATTORNEYS Patented July 30, 1929.

1,722,827

UNITED STATES PATENT OFFICE.

FRED M. ROSENZWEIG, OF NIAGARA FALLS, NEW YORK, ASSIGNOR TO THE REGAN SAFETY DEVICES COMPANY, INC., OF NEW YORK, N. Y., A CORPORATION OF NEW YORK.

INDUCTION TRAIN-CONTROL SYSTEM.

Application filed March 13, 1924. Serial No. 699,139.

This invention relates to a train control system, and more particularly to a train control system of the induction type; and has special reference to the provision of a system of this nature in which a train or vehicle is automatically controlled from the roadside to produce restrictive movements of the vehicle, and in which such restrictive movements may be modified by manual intervention of the engineman to permit the vehicle to proceed under given speed limitations.

A prime object of my present invention comprehends the provision of an induction train control system in which when a given restriction such as a vehicle "stop" effect is imposed upon the vehicle in response to a "non-clear" such as a "danger" roadside condition, the restriction may be modified by the manual intervention of the engineman when the vehicle has been reduced to a speed which is less restrictive than the imposed restriction, as for example a speed at or below a relatively low limit, the manual control being so designed as to permit the acceleration of the speed of the vehicle from the low limit to a second and relatively higher speed limit.

A further prime object of my present invention relates to the provision of an induction train control system of the character referred to in which the manual modification of the automatically imposed restriction is so carried out as not to interfere with the continuous automatic control of the vehicle from the roadside, the system being capable of functioning so that when the vehicle reaches the next roadside control station the control mechanism for the vehicle will again automatically respond to roadside conditions.

To the accomplishment of the foregoing and such other objects as will hereinafter appear, my invention consists in the elements and their relation one to the other as hereinafter particularly described and sought to be defined in the claims; reference being had to the accompanying drawings which show a preferred embodiment of my invention, and in which:

Fig. 1 is a wiring diagrammatic view showing the vehicle carried apparatus of my invention and roadside apparatus cooperating therewith, and Fig. 2 is a wiring diagrammatic view showing some of the principles of my invention embodied in a modified form.

Before describing my invention in detail, I will briefly relate that in the induction train control system of my invention a train control mechanism such as a valve V which may control the train line of an air brake system is operated by means of train carried energy such as the alternating current generator G, and is controlled by cooperation of a vehicle carried inductor means generally designated as A and a roadside inductor means generally designated as B, the vehicle carried and roadside inductor means A—B cooperating intermittently in the movement of the vehicle to produce controlling operations of the valve V such as vehicle "proceed" and "stop" operations in response to one or more roadside conditions such as "clear" and "danger" conditions. When the inductor means A—B cooperate in this system to produce a restrictive operation in the valve V for effecting a vehicle "stop", the invention further includes the provision of manually controllable mechanism generally designated as M for modifying the imposed restriction, the said mechanism M being operably effective however only when the vehicle has been reduced to a predetermined low speed, the operation of the manually controllable mechanism M in such event imposing a relatively higher speed limitation on the vehicle to permit the same to be accelerated from the relatively low to the relatively higher speed, the system being thus designed to effect dispatch of trains with complete safety.

The valve V may be any suitable valve for controlling the flow of air in the train line of an air brake system, such valve being preferably of the type shown in the patent to A. B. Kendall No. 1,474,836 of Nov. 20, 1923. The valve V is controlled by means of an electromagnetic device 10 which is energized under normal running conditions of the train by a vehicle carried circuit designated for convenience as $i$, the said circuit comprising generator G, conductors 11, 12, 13 and 14, contact 15 normally closed by the energization of the elements $f$, $f'$ of an indication means such as the relay F to be described more in detail hereinafter, conductor 16, electromagnet 10 and conductors 17, 18 and 19.

In the present embodiment of my invention, the circuit $i$ is controlled and operated to produce vehicle "proceed" and "stop" effects by the cooperation of the inductor means A—B in response to "clear" and "danger" conditions respectively. Under "normal" or "clear" running conditions of the train, the circuit $i$ is maintained energized by the energization of the field and armature elements $f$ and $f'$ of the indication means or relay F, the field $f$ being always maintained in a state of energization by means of the vehicle circuit comprising the generator G, conductors 11 and 12, conductors 20 and 21, field $f$, conductors 22 and 23, and conductors 18 and 19. The armature element $f'$ is energized by a circuit designated for convenience as $j$, the said circuit comprising an inductor $b$, conductor 24, a second inductor $c$, conductors 25 and 26, the armature element $f'$, conductors 27 and 28, stick contact 29 which together with the contact 15 is controlled by operation of the relay element $f'$, and conductors 30 and 31. The inductors $b$ and $c$ are energy receiving inductors which are coupled for energy reception to vehicle carried energizing inductors $a$ and $d$, both of which receive energy from the generator G, the inductor $a$ being for this purpose connected to the generator by means of the conductors 11, 32, 33, 34, 35 and 19, and the inductor $d$ being connected in multiple with the inductor $a$ to the energy source by means of the conductors 36 and 37.

With this construction, it will be manifest that when the train is moving under normal conditions between control stations, the circuit $j$ by the inductive coupling between the inductors receives energy from the vehicle carried generator G to maintain the armature $f'$ energized and the stick circuit closed for maintaining in turn the control circuit $i$ energized.

It will be noted that the inductively coupled vehicle carried inductors are symmetrically arranged, and that the energizing inductors $a$ and $d$ are arranged so that their instantaneous polarities are opposite in phase as indicated by the designations N and S for inductor $a$ and S and N for inductor $d$, this arrangement being provided for eliminating or neutralizing the effect of stray fields or leakage, all as described and claimed in my copending application Ser. No. 717,989, filed June 5, 1924. It will be understood that the energy receiving inductors $b$ and $c$ are connected together, as shown in Fig. 1 of the drawings, so that the instantaneous currents therein are additive, these inductors being arranged in assisting, and not in bucking or opposing relation. It will be understood, however, that the inductors may be arranged in any desired fashion, as disclosed for example in the application of A. G. Shaver Serial No. 506,595 of Oct. 10, 1921, or as disclosed in the application of Shaver & Rosenzweig, Ser. No. 536,552 of May 4, 1923.

For operating the stick circuit $j$ in response to roadside conditions, there is provided the roadside inductor means B which comprises the spaced inductors $a'$ and $d'$ arranged to correspond to the spacing of the vehicle inductors $a$ and $d$, the said roadside inductors $a'$ and $d'$ being connected to a third inductor $e'$ by means of a circuit generally designated as $k$ and comprising a contact 38 controlled by relay magnet 39, conductor 40, inductor $d'$, and conductor 41, inductor $e'$, conductor 42, inductor $a'$, conductor 43, condenser 44, and conductor 44', the said condenser being desirably provided for bringing the circuit $k$ to a state of resonance. Under "clear" roadside conditions the relay magnet 39 is energized to close the contact 38 for closing the circuit $k$, and under "danger" roadside conditions the relay magnet is deenergized for opening the circuit $k$.

With the provision of this inductor means B and its control by roadside conditions, it will be seen that when the vehicle carried inductor means A moves over the roadside inductor means B under "clear" roadside conditions, due to the roadside inductors being connected in closed circuit the transmission of energy from the vehicle energizing inductors $a$—$d$ to the energy receiving inductors $b$—$c$ will not be hindered, so that the vehicle carried circuits $j$ and $i$ will remain closed. If, however, the vehicle carried inductor means A moves over the roadside inductor means B under "danger" roadside conditions, with the roadside circuit $k$ open, the roadside inductors $a'$ and $d'$ will influence the vehicle inductor combinations $a$—$b$ and $c$—$d$ respectively, for diverting or shunting the lines of flux resulting in the effective deenergization of the vehicle circuit $j$ and the opening of the stick contact 29 and the circuit $i$, producing a "stop" operation of the magnet 10.

As heretofore referred to, when a vehicle restrictive such as a "stop" operation is produced automatically by the cooperation of the vehicle carried and roadside inductors, the "stop" operation may be modified by the manual intervention of the engineman after a low speed is reached, after which the train may be accelerated to a medium speed limitation.

To accomplish this, the mechanism M heretofore mentioned is provided, the said mechanism comprising a speed controller 45 operated by movement of the vehicle, and a manually operable switch generally designated as 46 connected by circuit means to be described presently to operate an armautre element $f^2$ forming part of the relay F.

When a "stop" operation is automatically produced and the vehicle is thereby reduced to a low speed limit, the switch 46 is operated by the engineman to close a circuit generally designated as $o$ which comprises the switch contact 47, the conductor 48, low speed contact L of the speed controller 45, common contact C, conductor 49, conductor 31, inductor $b$, conductor 24, inductor $c$, conductor 25, conductor 50, relay armature $f^2$, and conductor 51 back to the contact 47. It will be noted that this circuit is not only taken through the low speed contact of the speed controller, but through the energy receiving inductors $b$—$c$ so that the circuit $o$ is energized from the vehicle carried inductors $a$—$d$ after the same have passed the roadside inductor means B.

The manually operable switch means 46 is preferably of the single impulse type disclosed in the application of A. G. Shaver, Serial No. 634,053 of April 23, 1923, designed so that the circuit $o$ may be but momentarily closed, the said switch means comprising to this end an operated piston stem 52, the lower end of which seats in a push button receptacle 53 containing a fluid, the construction being such that upon upward operation of the push button receptacle, the fluid transmits the operating impulse to the piston stem 52, the said piston stem being thereafter free to descend to inoperative position even though the push button receptacle is held or maintained by the engineman in ascended position.

The momentary closing of the circuit $o$ in energizing the relay armature $f^2$ causes the closing of contacts 54 and 55. The contact 54 is a stick contact controlling a medium speed circuit generally designated as $p$, the said circuit comprising the contact 54, the conductor 56, the medium speed contact $m$ of the speed controller 45, common contact C, conductor 49, conductor 31, inductor $b$, conductor 24, inductor $c$, conductors 25 and 50, relay armature $f^2$ and conductor 57 back to contact 54. The closing of this medium speed circuit $p$ in maintaining the energization of the relay armature $f^2$, maintains closed the contact 55, the latter operating the controlling circuit $i$ to energize and hold energized the valve magnet 10 by means of the following circuit: generator G, conductors 11, 12 and 13, contact 55, conductor 16, magnet 10 and conductors 17, 18 and 19. It will therefore be seen that after the vehicle has been reduced to the low speed, the engineman if alert may inhibit or modify the "stop" and place the vehicle under the control of a medium speed, permitting acceleration to such medium speed. If this medium speed is exceeded, the circuit $o$ will automatically open and produce a "stop" operation, necessitating a manual resetting operation of the switch 47 after the speed is reduced again to the low level. It will be also noted that the medium speed circuit is also under the control of the inductor means A, so that if the next control station is a "danger" station, the vehicle carried and roadside inductor means A—B will cooperate to deenergize the relay element $f^2$ and again automatically impose a stop restriction on the vehicle.

For the purpose of automatically resetting the vehicle control circuits to the normal operating position when the roadside conditions change from "danger" to "clear", the vehicle carried inductor means A further includes an inductor $e$ arranged to move over the roadside inductor $e'$, the vehicle inductor $e$ being connected to an armature coil $h'$ of a two-element relay H having a field element or coil $h$, the inductor $e$ being connected to the armature $h'$ by means of the conductors 58 and 59. The relay field $h$ is always energized from the vehicle carried generator G, the field $h$ being to this end connected in multiple with the field $f$ of the relay F to the conductors 20 and 23 by means of the conductors 60 and 61 respectively. The inductor $e$ desirably includes a winding 62 coiled about the inductor core, the said winding being connected in circuit with a condenser 63, the value of which is such as to produce a state of resonance in the inductor $e$.

When the roadside conditions have changed from "danger" to "clear" and the vehicle carried inductor means A moves over the roadside closed inductor system B, the vehicle energizing inductors $a$—$d$ energize the roadside inductors $a'$—$d'$, producing an energizing impulse in the central inductor $e'$, the latter in turn transmitting said impulse to the vehicle carried receiving inductor $e$, the energization of which operates the relay H to close a contact 64 controlled thereby. This contact is connected in parallel to the stick contact 29 of the circuit $j$ by means of the conductors 65 and 66 so that the momentary closing of the contact 64 closes the circuit $j$, which latter will be maintained closed by the closing of the stick contact 29, with the result that the normal operating circuits $j$ and $i$ are reset.

Referring now to Fig. 2 of the drawings, I show an induction system embodying some of the principles of my invention in which a persisting restriction which is imposed on the vehicle carried mechanism may be modified manually to remove the restriction provided the vehicle has been reduced to a safe limit, the manual modification being effective without interfering with the automatic control of the vehicle at a subsequent control station.

The cooperating vehicle carried and roadside inductor means in this form of my invention may comprise the vehicle carried inductor system A' composed of the energizing inductors $a^2$ and $d^2$ arranged in series and connected to the alternating current generator G' by means of the conductors 70 and 71 and the energy receiving inductor $b^2$ inductively coupled to the inductors $a^2$ and $d^2$, the roadside inductor means B' being composed of the three inductors $a^4$, $e^4$ and $b^4$ connected in series in a circuit $k'$ similar to that heretofore described controlled by the relay magnet 39'.

The vehicle energy receiving inductor $b^2$ is connected to the elements $f^3$ and $f^4$ of an indication means F² by means of a stick circuit designated as j', the said circuit comprising the inductor b², conductor 72, condenser 72' provided preferably for placing the circuit in a state of resonance, conductor 73, field coil f³, conductor 74, field coil f⁴, conductor 75, stick contact 76, and conductors 77 and 78. Normally this circuit is closed for energizing the indication means or relay F², and for closing the contact 79 so that the circuit i' which controls the magnet 10' and valve V' is normally closed.

When the inductor means A'—B' cooperate under "danger" roadside conditions, the stick circuit j' will be opened and the controlling circuit i' opened to produce a vehicle "stop" operation. This "stop" operation may then be modified by the intervention of the engineman by operating the manually controllable means M', said means comprising a circuit o' controlled by a switch 46' similar to that heretofore described in connection with Fig. 1, the circuit including the speed controller 45' the contacts of which are closed when the vehicle has been reduced to a low predetermined speed, the conductor 80, conductor 75, relay armature f⁴, conductor 74, relay field f³, conductor 73, condenser 72', conductor 72, inductor b², conductor 78, conductor 81, contact 82 operated by the switch 46' and conductor 83. It will thus be evident that upon closing the manually operable mechanism M', the relay F² will be energized by the inductor means A', and it will be noted that when the relay is energized, the stick contact 76 will be closed for closing the relay energizing circuit j' removing the speed restriction. Upon reaching the next control station if "danger" roadside conditions still exist, the relay F² will again be operated to produce a vehicle "stop" operation.

While I have shown my invention in the preferred forms, it will be obvious that many changes and modifications may be made in the structure disclosed without departing from the spirit of the invention, defined in the following claims.

I claim:

1. In an induction speed control system for vehicles, vehicle carried mechanism comprising a device for controlling the movement of the vehicle, means including an inductor operable in response to a "non-clear" roadside condition for operating the said device to impose a given restriction on the movement of the vehicle, and manually controllable mechanism operably effective only when the vehicle is moving at or below a relatively low speed limit which is less restrictive than the said given restriction for operating the said device to impose a second and relatively higher speed limit on the vehicle.

2. In an induction speed control system for vehicles, vehicle carried mechanism comprising a device for controlling the movement of the vehicle, means including an energy receiving inductor operable in response to a "non-clear" roadside condition for operating the said device to stop the movement of the vehicle, and manually controllable mechanism operably effective only when the vehicle is moving at or below a relatively low speed limit for operating the said device to impose a second and relatively higher speed limit on the vehicle.

3. In an induction speed control system for vehicles, vehicle carried mechanism comprising a device for controlling the movement of the vehicle, means including an inductor operable in response to a "non-clear" roadside condition for operating the said device to impose a given restriction on the movement of the vehicle, a speed controller, and manually controllable mechanism connected to the speed controller and operably effective only when the vehicle is moving at or below a relatively low speed limit which is less restrictive than the said given restriction for placing the said device under the control of the speed controller to impose a second and relatively higher speed limit on the vehicle.

4. In an induction speed control system for vehicles, vehicle carried mechanism comprising a valve magnet for controlling the movement of the vehicle, circuit means including energy receiving inductors and energizing inductors coupled thereto operable in response to a "non-clear" roadside condition for operating the said magnet to impose a "stop" condition on the movement of the vehicle, and manually controllable circuit mechanism operably effective only when the vehicle is moving at or below a relatively low speed limit for operating the said magnet to impose a second and relatively higher speed limit on the vehicle.

5. In an induction speed control system for vehicles, vehicle carried mechanism comprising a device for controlling the movement of the vehicle, an indication means for controlling the operation of said device, induction means adapted to be operated by roadside mechanism in response to roadside conditions for operating the said indication means to produce in the said device either a vehicle "proceed" or a vehicle restrictive operation, a speed controller, and manually controllable mechanism operable after a given restrictive operation is produced in said device in response to a "non-clear" roadside condition and operable only when the vehicle is moving at or below a relatively low speed limit which is less restrictive than the said given restriction for operating the indication means and for placing the same under the control of the speed controller and the said induction means to impose a speed limit on the vehicle higher than said relatively low speed limit and to permit the said indication means to be operated by the said induction means in response to further roadside conditions.

6. In an induction speed control system for vehicles, vehicle carried mechanism comprising an electromagnetic device for controlling the movement of the vehicle, an indication means for controlling the operation of said device, induction means adapted to be operated by roadside mechanism in response to a "non-clear" roadside condition for operating the said indication means to produce in the said device a given vehicle restrictive operation, a speed controller, and manually controllable mechanism operable after said restrictive operation is produced in said device and operable only when the vehicle is moving at or below a relatively low speed limit which is less restrictive than the said given restriction for operating the indication means and for placing the same under the control of the speed controller and the said induction means.

7. In an induction speed control system for vehicles, vehicle carried mechanism comprising a device for controlling the movement of the vehicle, an indication means for controlling the operation of said device, energy receiving inductor means adapted to be operated by roadside mechanism in response to roadside conditions for operating the said indication means to produce in the said device either a vehicle "proceed" or a "stop" operation, a speed controller, and manually controllable mechanism connected to said speed controller and operable after a "stop" operation is produced in said device in response to a "danger" roadside condition and operable only when the vehicle is moving at or below a relatively low speed limit for operating the indication means and for placing the same under the control of the speed controller and the said energy receiving inductor means to impose a speed limit on the vehicle higher than said relatively low speed limit and to permit the said indication means to be operated by the said inductor means in response to further "danger" roadside conditions.

8. In an induction speed control system for vehicles, vehicle carried mechanism comprising a device for controlling the movement of the vehicle, means including an inductor for controlling the operation of said device and operable in response to a "non-clear" roadside condition for disconnecting the device from the control of the inductor and operating the said device to impose a persisting restriction on the movement of the vehicle, and manually controllable means operably effective only when the vehicle is moving at or below a given speed limit for operating the said device to remove the restriction and for placing said device again under the control of the inductor.

9. In an induction speed control system for vehicles, vehicle carried mechanism comprising a device for controlling the movement of the vehicle, means including a vehicle energy transmitting inductor and an energy receiving inductor coupled directly thereto for controlling the operation of said device, the said inductors being operable in response to a "non-clear" roadside condition for operating the said device to impose a persisting restriction on the movement of the vehicle, and manually controllable electro-magnetic means capable of being set only when the vehicle is moving at or below a given speed limit for operating the said device to remove the restriction and for placing said device again under the control of the said inductors.

10. In an induction speed control system for vehicles, vehicle carried mechanism comprising a device for controlling the movement of the vehicle, an indication means for controlling the operation of said device, an inductor connected to said indication means and operable in response to a "non-clear" roadside condition for disconnecting the indication means from the control of the inductor and for operating the said indication means to impose a persisting restriction on the movement of the vehicle, and manually controllable means operably effective only when the vehicle is moving at or below a given speed limit for operating the said indication means to remove the restriction and for again placing said indication means under the control of the inductor.

11. In an induction speed control system for vehicles, vehicle carried mechanism comprising a device for controlling the movement of the vehicle, an indication means for controlling the operation of said device, a vehicle energizing inductor and an energy receiving inductor coupled directly thereto, means connecting the energy receiving inductor with the indication means operable so that when the inductors are influenced by roadside mechanism in response to a "non-clear" roadside condition the indication means will be operated to produce a persisting restriction on the movement of the vehicle, and manually controllable means operably effective only when the vehicle is moving at or below a given speed limit for operating the said indication means to remove the restriction and for placing the same again under the control of the inductors.

12. The combination with the induction speed control system of claim 1, of inductor means controlled from the roadside for automatically resetting the said device to its normal condition for controlling the movement of the vehicle.

13. The combination with the induction speed control system of claim 2, of inductor means controlled from the roadside for automatically resetting the said device to its normal condition for controlling the movement of the vehicle.

14. The combination with the induction speed control system of claim 6, of inductor means controlled from the roadside for automatically resetting the said device to its normal condition for controlling the movement of the vehicle.

15. The combination with the induction speed control system of claim 8, of inductor means controlled from the roadside for automatically resetting the said device to its normal condition for controlling the movement of the vehicle.

16. The combination with the induction speed control system of claim 10, of inductor means controlled from the roadside for automatically resetting the said device to its normal condition for controlling the movement of the vehicle.

Signed at Niagara Falls, in the county of Niagara and State of New York, this 8th day of February, A. D. 1924.

FRED M. ROSENZWEIG.